United States Patent
Kurmi et al.

(10) Patent No.: US 11,809,840 B2
(45) Date of Patent: Nov. 7, 2023

(54) COGNITIVE SOFTWARE APPLICATION LEARNER AND ENHANCER

(71) Applicant: BANK OF AMERICA CORPORATION, Charlotte, NC (US)

(72) Inventors: Namrata Kurmi, Gautham Buddha Nagar (IN); Samir Kiranbhai Desai, Mumbai (IN); Pragyan Paramita Hembram, Telangana (IN); Srikanth Vemula, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 158 days.

(21) Appl. No.: 17/678,098

(22) Filed: Feb. 23, 2022

(65) Prior Publication Data
US 2023/0266949 A1    Aug. 24, 2023

(51) Int. Cl.
G06F 8/30    (2018.01)
G06N 20/00    (2019.01)

(52) U.S. Cl.
CPC .............. *G06F 8/311* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,580,982 B2 | 8/2009 | Owen | |
| 7,584,114 B2 | 9/2009 | Estrada | |
| 7,831,676 B1 | 11/2010 | Nagar | |
| 8,364,613 B1 * | 1/2013 | Lin | G06N 7/01 700/65 |
| 10,956,477 B1 * | 3/2021 | Fang | G06F 40/30 |
| 11,574,053 B1 * | 2/2023 | Chen | G06F 21/564 |
| 2002/0199194 A1 | 12/2002 | Ali | |
| 2003/0097617 A1 | 5/2003 | Goeller | |
| 2004/0034652 A1 | 2/2004 | Hofmann | |
| 2004/0111327 A1 | 6/2004 | Kidd | |
| 2004/0260621 A1 | 12/2004 | Foster | |
| 2005/0210111 A1 | 9/2005 | Fukudome | |
| 2005/0265319 A1 | 12/2005 | Clegg | |
| 2006/0095556 A1 | 5/2006 | Arnold | |
| 2006/0242140 A1 | 10/2006 | Wnek | |
| 2007/0011073 A1 | 1/2007 | Gardner | |
| 2007/0136430 A1 | 6/2007 | Qureshi | |

(Continued)

*Primary Examiner* — Qing Chen
(74) *Attorney, Agent, or Firm* — Moore & Van Allen PLLC; Anup Shrinivasan Iyer

(57) ABSTRACT

Systems, computer program products, and methods are described herein for continuous cognitive code logic detection and prediction using machine learning techniques. The present invention is configured to receive, from a user input device, source code scripts and target code scripts for functional code logic components of a full stack, wherein the source code scripts and the target code scripts are associated with one or more tiers; generate a training dataset based on at least the source code scripts, the target code scripts, and the functional code logic components of the full stack; train, using a machine learning algorithm, a machine learning model using the training dataset; determine a prediction accuracy associated with the machine learning model; determine that the prediction accuracy is greater than a predetermined threshold; and deploy the machine learning model on unseen source code scripts.

20 Claims, 4 Drawing Sheets

(56) References Cited

U.S. PATENT DOCUMENTS

| | | |
|---|---|---|
| 2007/0203996 A1 | 8/2007 | Davitz |
| 2008/0168269 A1 | 7/2008 | Wilson |
| 2009/0138711 A1 | 5/2009 | Heimbigner |
| 2010/0161506 A1 | 6/2010 | Bosenick |
| 2010/0161735 A1 | 6/2010 | Sharma |
| 2010/0312837 A1 | 12/2010 | Bodapati |
| 2011/0179067 A1 | 7/2011 | Dalvi |
| 2012/0053887 A1 | 3/2012 | Nurmi |
| 2021/0019249 A1* | 1/2021 | Gnaneswaran ........ G06N 20/20 |
| 2022/0366040 A1* | 11/2022 | Marbouti .............. G06F 21/554 |

* cited by examiner

COGNITIVE SOFTWARE APPLICATION LEARNER AND ENHANCER

FIELD OF THE INVENTION

The present invention embraces a system for cognitive software application learner and enhancer. More specifically, the present invention describes a system for continuous cognitive code logic detection and prediction using machine learning techniques.

BACKGROUND

Software enhancements are modifications or improvements made to a particular software application to improve performance, capabilities, or capacity of the application, or which provide additional functions to the application. With the ever improving technology and development of better methodologies, software application enhancement often leverages the benefits of the new version of the same technology, or a different technology altogether for the same functional code logic components of an application. Developers, during a software enhancement process, typically develop the target code for each source code manually, which often results in software defects due to human error. Therefore, there is a need for system for continuous cognitive code logic detection and prediction using machine learning techniques.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for continuous cognitive code logic detection and prediction using machine learning techniques is presented. The system comprising: at least one non-transitory storage device; and at least one processor coupled to the at least one non-transitory storage device, wherein the at least one processor is configured to: electronically receive, from a user input device, source code scripts for functional code logic components of a full stack, wherein the source code scripts are associated with one or more tiers; electronically receive, from the user input device, target code scripts for the functional code logic components of the full stack, wherein the target code scripts are associated with the one or more tiers; generate a training dataset based on at least the source code scripts, the target code scripts, and the functional code logic components of the full stack; train, using a machine learning algorithm, a machine learning model using the training dataset; determine a prediction accuracy associated with the machine learning model; determine that the prediction accuracy is greater than a predetermined threshold; and deploy the machine learning model on unseen source code scripts.

In some embodiments, the at least one processor is further configured to: electronically receive, from the user input device, unseen source code scripts; determine functional code logic components of the full stack from the unseen source code scripts; electronically receive, from the user input device, target code requirements; predict, using the machine learning model, target code scripts corresponding to the unseen source code scripts for the one or more tiers based on at least the unseen source code scripts, the functional code logic components of the full stack associated with the unseen source code scripts, and the target code requirements; and transmit control signals configured to cause the user input device to display the predicted target code scripts.

In some embodiments, the at least one processor is further configured to: initiate a code validation engine on the predicted target code scripts; validate, using the code validation engine, the predicted target code scripts; and transmit control signals configured to cause the user input device to display a notification indicating that the predicted target code scripts are valid.

In some embodiments, the one or more tiers comprises at least a front-end tier, a business logic tier, and a back-end tier.

In some embodiments, the source code scripts are associated with a first programming language and the target code scripts are associated with a second programming language.

In some embodiments, the source code scripts are associated with a first version of the first programming language and the target code scripts are associated with a second version of the first programming language.

In some embodiments, the source code scripts are associated with the first version of the first programming language to be implemented in a first tier and the target code scripts are associated with the first version of the first programming language to be implemented in a second tier.

In some embodiments, the at least one processor is further configured to: store the source code scripts and the target code scripts in a code repository.

In some embodiments, the at least one processor is further configured to: electronically receive, from the user input device, a source code location path and a target code location path associated with the code repository; and retrieve, from the code repository, the source code based on at least the source code location path and the target code based on at least the target code location path.

In some embodiments, the at least one processor is further configured to: transmit control signals configured to cause the user input device to display an artifact loader interface; and electronically receive, via the artifact loader interface, the source code scripts and the target code scripts.

In another aspect, a computer program product for continuous cognitive code logic detection and prediction using machine learning techniques is presented. The computer program product comprising a non-transitory computer-readable medium comprising code causing a first apparatus to: electronically receive, from a user input device, source code scripts for functional code logic components of a full stack, wherein the source code scripts are associated with one or more tiers; electronically receive, from the user input device, target code scripts for the functional code logic components of the full stack, wherein the target code scripts are associated with the one or more tiers; generate a training dataset based on at least the source code scripts, the target code scripts, and the functional code logic components of the full stack; train, using a machine learning algorithm, a machine learning model using the training dataset; determine a prediction accuracy associated with the machine learning model; determine that the prediction accuracy is greater than a predetermined threshold; and deploy the machine learning model on unseen source code scripts.

In yet another aspect, a method for continuous cognitive code logic detection and prediction using machine learning techniques is presented. The method comprising: electronically receiving, from a user input device, source code scripts for functional code logic components of a full stack, wherein the source code scripts are associated with one or more tiers; electronically receiving, from the user input device, target code scripts for the functional code logic components of the full stack, wherein the target code scripts are associated with the one or more tiers; generating a training dataset based on at least the source code scripts, the target code scripts, and the functional code logic components of the full stack; training, using a machine learning algorithm, a machine learning model using the training dataset; determining a prediction accuracy associated with the machine learning model; determining that the prediction accuracy is greater than a predetermined threshold; and deploying the machine learning model on unseen source code scripts.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
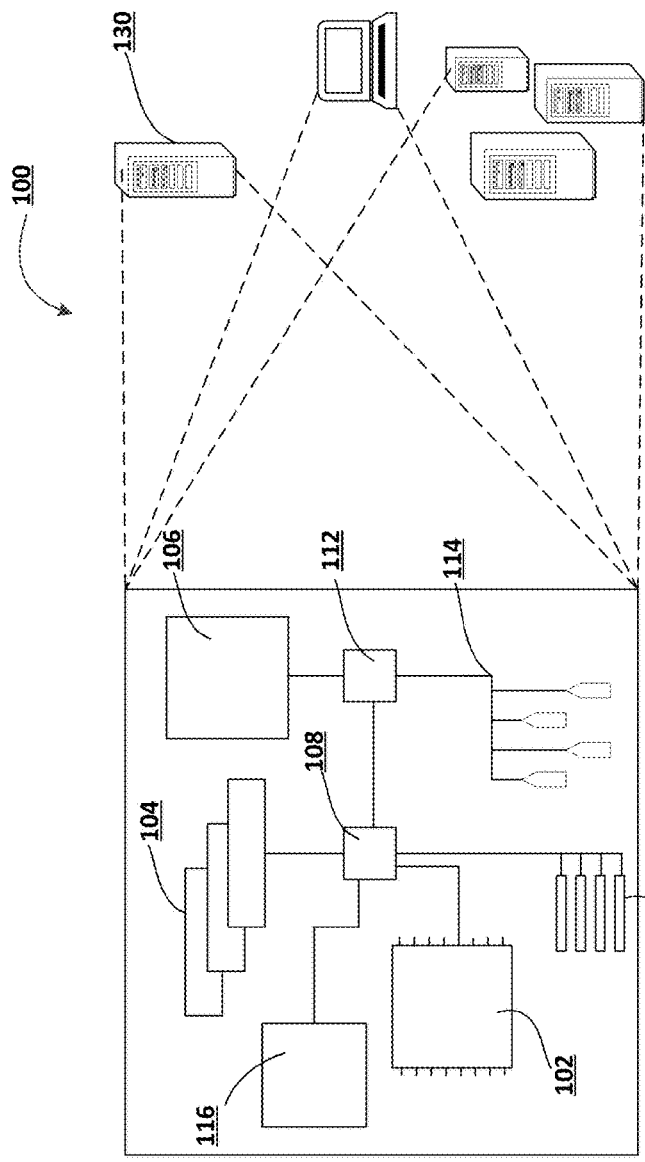
Figure 1:
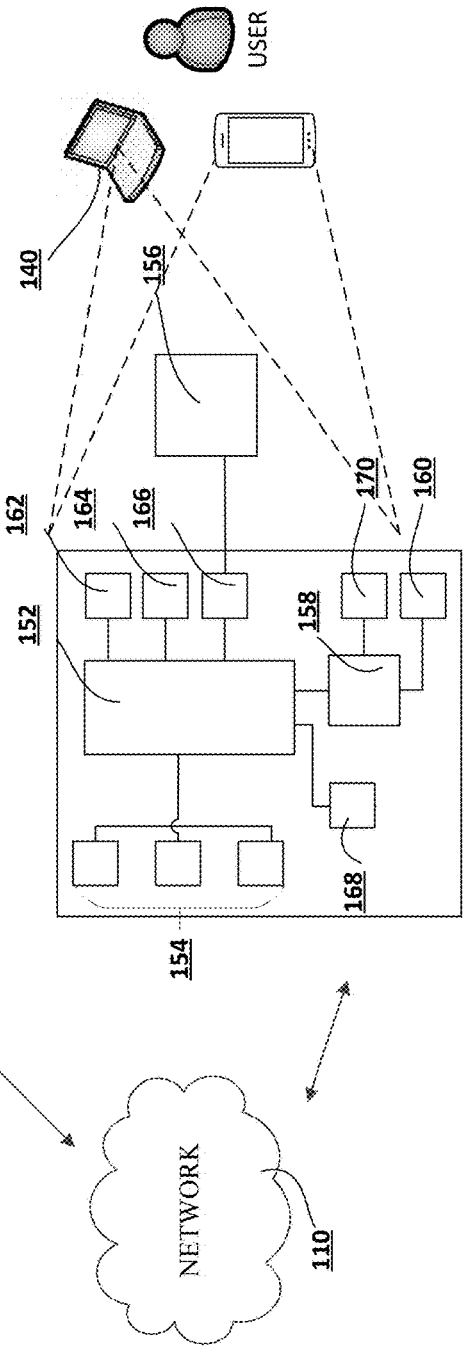
Figure 2:
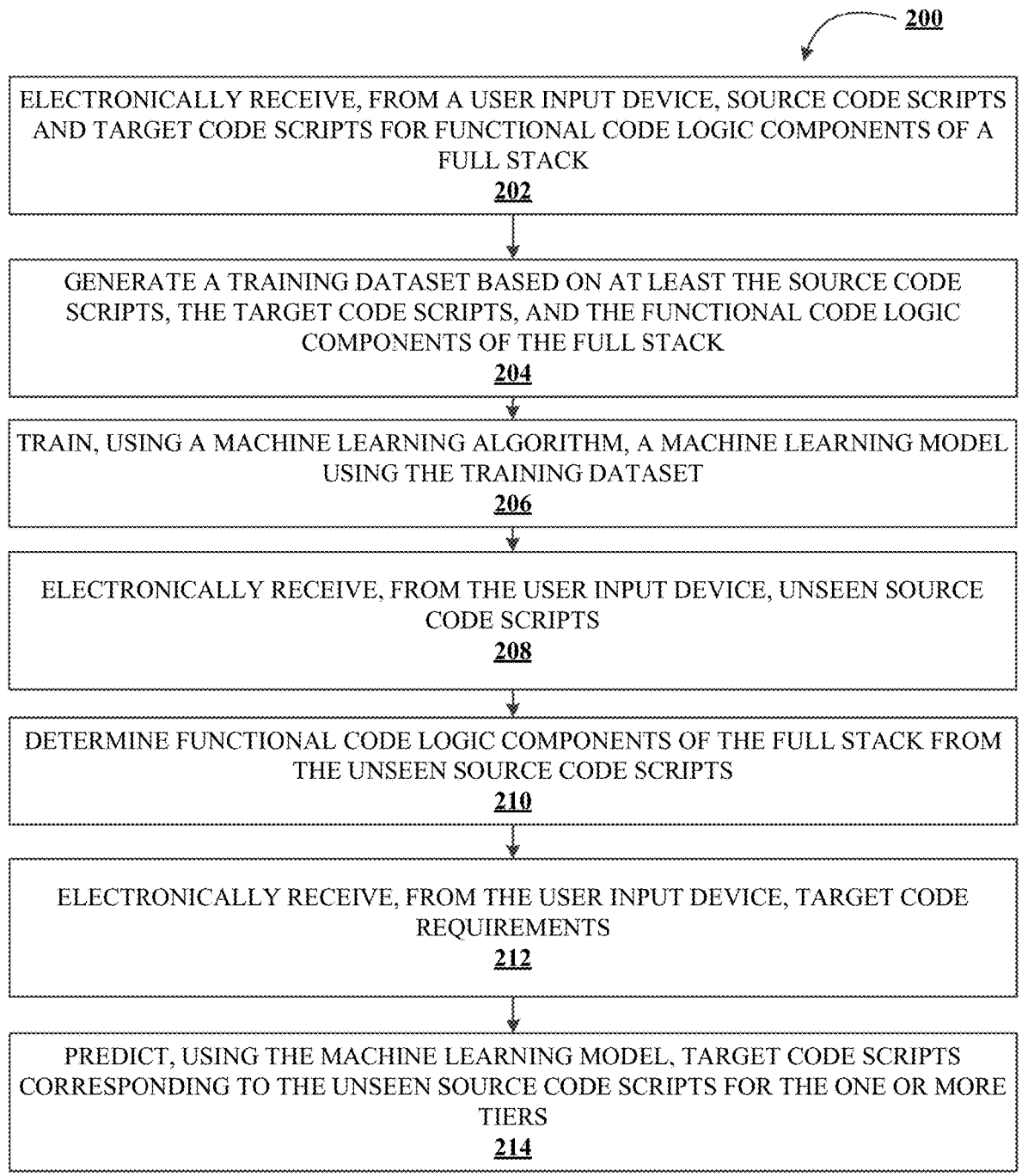
Figure 3A:
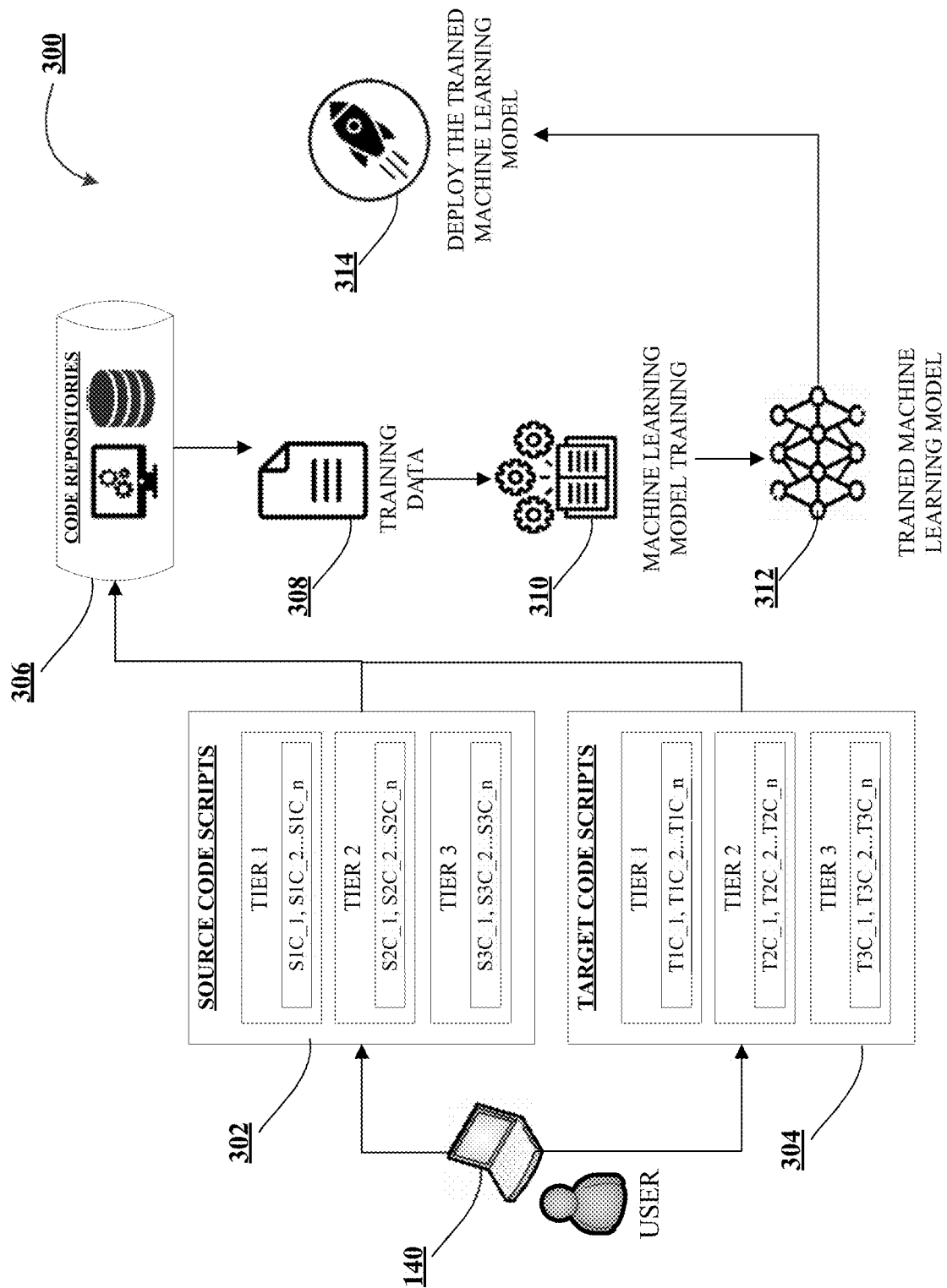
Figure 3B:
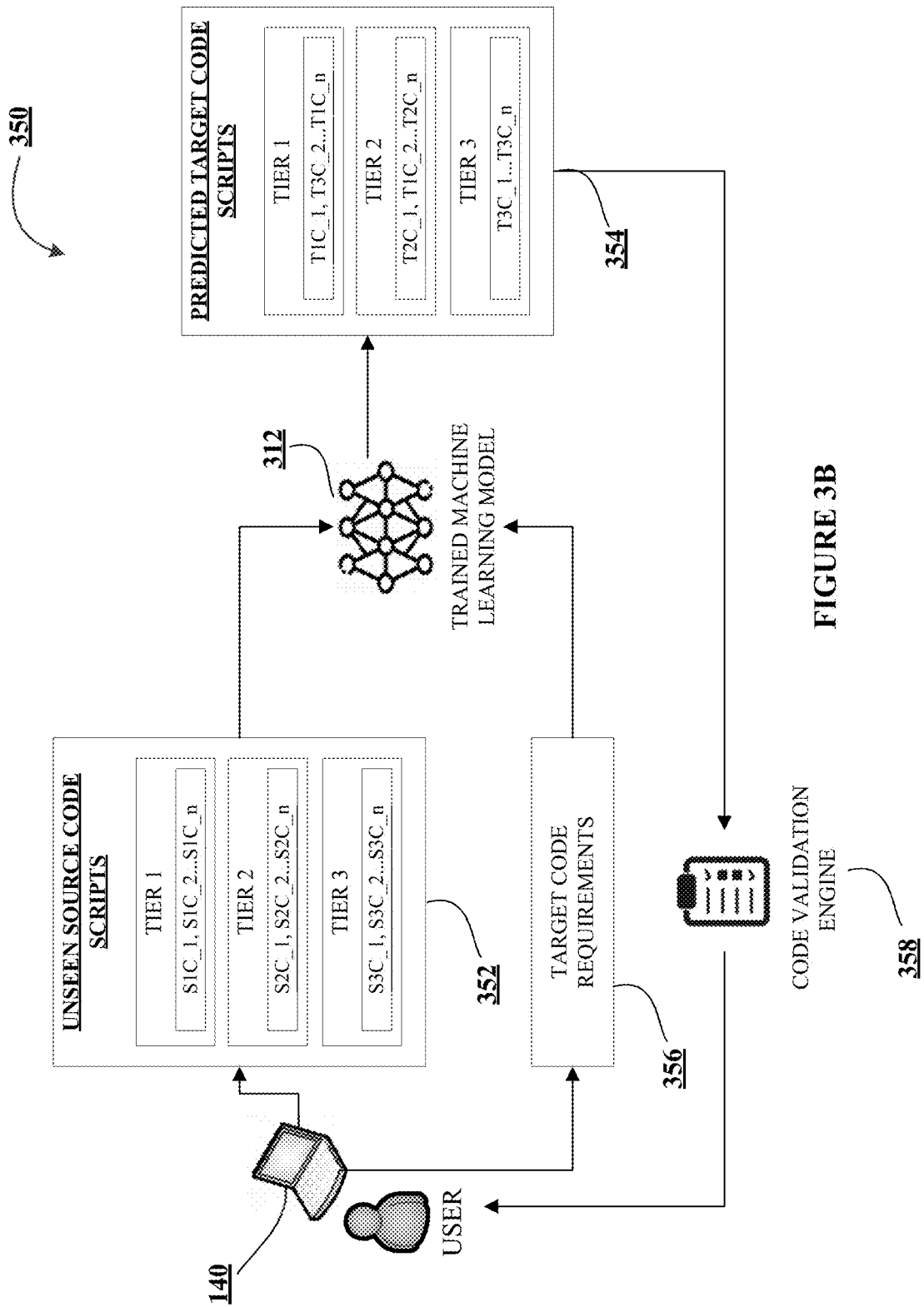

Having thus described embodiments of the invention in general terms, reference will now be made the accompanying drawings, wherein:

FIG. 1 illustrates technical components of a system for continuous cognitive code logic detection and prediction using machine learning techniques, in accordance with an embodiment of the invention;

FIG. 2 illustrates a process flow for continuous cognitive code logic detection and prediction using machine learning techniques, in accordance with an embodiment of the invention; and FIGS. 3A and 3B illustrate a flow diagram for continuous cognitive code logic detection and prediction using machine learning techniques, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Software enhancements are modifications or improvements made to a particular software application to improve performance, capabilities, or capacity of the application, or which provide additional functions to the application. With the ever improving technology and development of better methodologies, software application enhancement often leverages the benefits of the new version of the same technology, or a different technology altogether for the same functional code logic components of an application. More specifically, during the software enhancement process, developers typically replace the source code script for a specific functional code logic component with a target code script designed to have the same functionality.

In cases where the enhancement process includes leveraging the benefits of a newer version of the same technology, the source code scripts may be code specifically designed for one or more tiers in the full stack, written using a previous version of human-readable programming language and the target code scripts may be code specifically designed for the one or more tiers in the full stack, written using a newer version of the same human-readable programming language. In cases where the enhancement process includes leveraging the benefits of a different technology altogether, the source code scripts may be code specifically designed for one or more tiers in the full stack, written using a human-readable programming language and the target code scripts may be code specifically designed for the one or more tiers in the full stack written using a different human-readable programming language. In addition to leveraging benefits of the new version of the same technology, or a different technology altogether, the software enhancement process may also include identifying the appropriate tier for code logic implementation. In such cases, the source code scripts may include code that implemented in a particular tier in the full stack and the target code scripts may be code that identifies a more appropriate tier for that code.

Software enhancements often come with a huge cost and time as these are human efforts by and large. More specifically, developers, during a software enhancement process, typically develop the target code for each source code manually, which often results in software defects due to human error. The present invention provides the functional benefit of minimizing the instances of software defects due to human error by leveraging machine learning techniques to implement continuous cognitive code logic detection and prediction. Accordingly, the present invention includes providing the user (developer) with a simple interface to submit the scripts/code from the old version/technology, i.e., source code scripts, and the equivalent code from the new version/technology, i.e., target code scripts. The developers may also specify the specific application tier for each set of submissions while submitting the script/code. This information is then used to train a machine learning model to understand each functional code logic component of the source code script and the target code script and its tier specific importance. This trained model may then be used to ingest unseen source code scripts and target code requirements (e.g., updated version, new technology, or the like), and predict a corresponding target code script for the same functional code logic components and best fit tier.

FIG. 1 illustrates technical components of a system for continuous cognitive code logic detection and prediction using machine learning techniques 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input device 140. In some embodiments, the system 130, and the user input device 140 may be used to implement the processes described herein, in accordance with an embodiment of the present invention. In this regard, the system 130 and/or the user input device 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, servers, wearable devices, Internet-of-things devices, electronic kiosk devices (e.g., automated teller machine devices), blade servers, mainframes, or any combination of the aforementioned. In accordance with embodiments of the invention, the user input device 140 is intended to represent various forms of mobile devices, such as personal digital assistants, cellular telephones, smartphones, augmented reality (AR) devices, virtual reality (VR) devices, extended reality (XR) devices, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 as part of an application that may perform the functions disclosed herein, display graphical information for a GUI on an external input/output device, such as display 116 coupled to a high-speed interface 108, and/or the like. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input device 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154, which in one embodiment includes the instructions of an application that may perform the functions disclosed herein. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130 and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140 (or any other computing devices) may provide the system 130 with permissioned to access the protected resources of the user input device 130 (or any other computing devices), which may include a GPS device, an image capturing component (e.g., camera), a microphone, a speaker, and/or any of the components described herein.

The user input device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiment of the invention, the components of the system environment 100, such as the system 130 and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the system 130 may be separated into two or more distinct portions.

FIG. 2 illustrates a process flow for continuous cognitive code logic detection and prediction using machine learning techniques 200, in accordance with an embodiment of the invention. As shown in block 202, the process flow includes electronically receiving, from a user input device, source code scripts and target code scripts for functional code logic components of a full stack. Next, as shown in block 204, the process flow includes electronically receiving, from the user input device, target code scripts for the functional code logic components of the full stack. As described herein, a full stack may include functional code logic components capable of handling a front-end tier, a business logic tier, and a back-end tier of software design (e.g., website design). The source code scripts for these functional code logic components may be any collection of code specifically designed for one or more tiers, with or without comments, written using a human-readable programming language. Similar to the source code scripts, the target code scripts for the functional code logic components may also be any collection of code specifically designed for the one or more tiers, with or without comments, written using a human-readable programming language.

In some embodiments, the system may be configured to transmit control signals configured to cause the user input device to display an artifact loader interface via which the user may load the source code scripts and the target code scripts. In one aspect, the user may directly input the source code scripts and the target code script into the artifact loader interface in text form. In another aspect, the user may provide a path address to the location of the source code scripts and the target code scripts stored in a code repository.

Next, as shown in block 204, the process flow includes generating a training dataset based on at least the source code scripts, the target code scripts, and the functional code logic components of the full stack. The training dataset may include a set of examples used to fit the parameters of a machine learning model. In some embodiments, the model (e.g., a naive Bayes classifier) may be trained on the training dataset using a supervised learning method, for example using optimization methods such as gradient descent or stochastic gradient descent. In one aspect, the training dataset may include one or more features and a corresponding label. Here, the features may include the source code script and the functional code logic components, and the corresponding label may be the target code script. In some embodiments, the features may also include metadata associated with the source code scripts and the target code scripts. Such metadata may include a specific application tier of relevance, programming language associated with the scripts, specific versions of the programming languages, and/or the like.

Next, as shown in block 206, the process flow includes training, using a machine learning algorithm, a machine learning model using the training dataset. As described herein, the machine learning model may refer to a mathematical model generated by machine learning algorithms based on training data, to make predictions or decisions without being explicitly programmed to do so. In some embodiments, the system may be configured to generate the machine learning model by implementing one or more machine learning algorithms capable of receiving an analyzing input data to predict output values within an acceptable range. Once trained, the system may be configured to determine classification parameters for the machine learning model that are then used on unseen source code scripts. In some embodiments, the machine learning model is run with the training dataset and produces a result, which is then compared with known target (e.g., target code script), for each feature vector in the training dataset to determine a prediction accuracy. This prediction accuracy is then compared with a predetermined threshold to determine whether the machine learning model is satisfactory. Based on the result of the comparison and the specific learning algorithm being used, the parameters of the model are adjusted until the prediction accuracy meets the predetermined threshold. The model fitting can include both variable selection and parameter estimation. Once the machine learning model is considered satisfactory, the system may be configured to deploy the machine learning model on unseen source code scripts.

Next, as shown in block 208, the process flow includes electronically receiving, from the user input device, unseen source code scripts. In some embodiments, the unseen source code scripts may be an existing collection of code specifically designed for one or more tiers, with or without comments, written using a human-readable programming language. Similar to source code scripts, the unseen source code scripts may either be directly input by the user into the artifact loader interface in text form or be in the form of a path address to the location of the unseen source code scripts stored in the code repository.

Next, as shown in block 210, the process flow includes determining functional code logic components of the full stack from the unseen source code scripts. As described herein, the functional code logic components may refer to specific portions or fragments of a software application in a specific tier. Each tier may have a number of functional code logic components designed using a collection of code, such as source code scripts or target code scripts. The functional code logic components may be designed to perform a specific set of tasks at specific time periods as part of the whole software application. In some embodiments, functional code logic components may be replaceable.

Next, as shown in block 212, the process flow includes electronically receiving, from the user input device, target code requirements. In some embodiments, the target code requirements may include a specific programming language requirement for the target code scripts, specific versions of the programming languages, and/or the like.

Next, as shown in block 214, the process flow includes predicting, using the machine learning model, target code scripts corresponding to the unseen source code scripts for the one or more tiers. In this regard, the machine learning model may take as input, the unseen source code scripts, the functional code logic components of the full stack associated with the unseen source code scripts, and the target code requirements, and predict a target code script corresponding to the unseen source code script, thereby converting unseen source code scripts to target code scripts. In response, the system may be configured to transmit control signals configured to cause the user input device to display the predicted target code scripts.

In some embodiments, the system may be configured to validate the prediction accuracy of the machine learning model by verifying whether the predicted target code scripts are indeed accurate. To this end, the system may be configured to initiate a code validation engine on the predicted target code scripts. Using the code validation engine, the system may be configured to validate the predicted target code scripts. As part of this process, the system may be configured to transmit the predicted target code scripts to the user input device with one or more prompts requesting user input to indicate as such. The user may then verify the predicted target code scripts for each functional code logic component and determine not only whether the predicted target code scripts is free of defects, but also whether the target code scripts meet the target code requirements. In some other embodiments, the validation process using the code validation engine may be an automated process where the code validation engine runs predetermined validation conditions on the target code scripts to verify the predicted target code scripts for each functional code logic component. In response, the system may be configured to transmit control signals configured to cause the user input device to display a notification indicating that the predicted target code scripts are valid.

FIG. 3A illustrates a flow diagram for continuous cognitive code logic detection using machine learning techniques 300, in accordance with an embodiment of the invention. As shown in FIG. 3A, to train a machine learning model to predict target code scripts corresponding to unseen source code scripts, the user, using a user input device 140 and via an artifacts loader interface, inputs the source code scripts 302 and the target code scripts 304. Here, functional code logic components associated with the source code script S1C_1, S1C_2, . . . , S1C_3 may be specifically designed for TIER 1, functional code logic components associated with the source code script S2C_1, S2C_2, . . . , S2C_3 may be specifically designed for TIER 2, and functional code logic components associated with the source code script S3C_1, S3C_2, . . . , S3C_3 may be specifically designed for TIER 3.

Similarly, functional code logic components associated with the target code script T1C_1, T1C_2, . . . , T1C_3 may be specifically designed for TIER 1, functional code logic components associated with the target code script T2C_1, T2C_2, . . . , T2C_3 may be specifically designed for TIER 2, and functional code logic components associated with the target code script T3C_1, T3C_2, . . . , T3C_3 may be specifically designed for TIER 3. These source code scripts 302 and target code scripts 304 may be stored in code repositories 306. In some embodiments, in addition to the scripts themselves, any additional metadata associated with the scripts are also stored in the code repositories. In one instance, the source code scripts 302 may be associated with a first programming language while the target code scripts 304 may be associated with a second programming language. In another instance, the source code scripts 302 may be associated with a first version of the first programming language while the target code scripts may be associated with a second version of the first programming language. In yet another instance, the source code scripts 302 may be associated with the first version of the first programming language to be implemented in a first tier while the target code scripts 304 are associated with the first version of the first programming language to be implemented in a second tier. This additional information may be received as metadata and stored in the code repositories 306 along with the source code scripts 302 and the target code scripts 304.

In some embodiments, to generate the training dataset 308, the source code scripts 302 and the target code scripts 304 (including any associated metadata) are then retrieved from the code repositories 306 to generate the training dataset 308. The machine learning model is then trained 310 using the training dataset to generate a trained machine learning model 312. Once generated, the prediction accuracy of the trained machine learning model 312 is then compared with a predetermined threshold to determine whether the machine learning model is satisfactory. Once the machine learning model is considered satisfactory, the machine learning model 314 may be ready to be deployed on unseen source code scripts.

FIG. 3B illustrates a flow diagram for continuous cognitive code logic prediction using machine learning techniques 350, in accordance with an embodiment of the invention. As shown in FIG. 3B, the trained machine learning model 312 may be deployed on unseen source code scripts 352. Similar to the source code scripts 302 in FIG. 3A, the user, using a user input device 140 and via the artifacts loader interface, may input the unseen source code scripts 352 and the target code requirements 356. The target code requirements 356 may specify a programming language requirement for the target code scripts, specific version requirement for the programming language, a specific tier recommendation for implementation, and/or the like. The unseen source code scripts 352 and the target code requirements 356 may then be fed into the trained machine learning model 312. The trained machine learning model 312 then generates the predicted target code scripts 354. In some embodiments, the trained machine learning model 312, when generating the predicted target code scripts 354, also provides a likelihood of fit of a particular predicted target code script in a specific tier. For instance, the unseen source code scripts 352 may have functional code logic components S1C_1, S1C_2, . . . , S1C_n associated with TIER 1 of the full stack. In addition to generating the predicted target code scripts 354 for TIER 1, the trained machine learning model 312 may also suggest appropriate tiers for the functional code logic components. Instead of TIER 1 of the predicted target code scripts 354 having functional code logic components T1C_1, T1C_2, . . . , T1C_n corresponding to the functional code logic components S1C_1, S1C_2, . . . , S1C_n associated with TIER 1 of the unseen source code scripts, the trained machine learning model 312 may suggest that functional code logic component T3C_2, that corresponds to functional logic component S3C_2, may be a better fit in TIER 1 instead of TIER 3. In some embodiments, the trained machine learning model 312, by way of training on source code scripts 302 and target code scripts 304 may be capable of back conversion, i.e., converting target code script back into source code script or even third language conversions from the indirect learning. For example, if reasonable learning happened based on language pair A and B, and language pair B and C, then the trained machine learning model 312 will have the capability to generate code for language pair C and A, and vice versa.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for continuous cognitive code logic detection and prediction using machine learning techniques, the system comprising:
   at least one non-transitory storage device; and
   at least one processor coupled to the at least one non-transitory storage device, wherein the at least one processor is configured to:
      electronically receive, from a user input device, source code scripts for functional code logic components of a full stack, wherein the source code scripts are associated with one or more tiers in the full stack;
      electronically receive, from the user input device, target code scripts for the functional code logic components of the full stack, wherein the target code scripts are associated with the one or more tiers in the full stack;
      generate a training dataset based on at least the source code scripts, the target code scripts, and the functional code logic components of the full stack;
      train, using a machine learning algorithm, a machine learning model using the training dataset;
      determine a prediction accuracy associated with the trained machine learning model;
      determine that the prediction accuracy associated with the trained machine learning model is greater than a predetermined threshold; and
      in response to determining that the prediction accuracy associated with the trained machine learning model is greater than the predetermined threshold, deploy the trained machine learning model on unseen source code scripts.

2. The system of claim 1, wherein the at least one processor is further configured to:
   electronically receive, from the user input device, the unseen source code scripts;
   determine functional code logic components of the full stack associated with the unseen source code scripts;
   electronically receive, from the user input device, target code requirements;
   predict, using the trained machine learning model, target code scripts corresponding to the unseen source code scripts for the one or more tiers in the full stack based on at least the unseen source code scripts, the functional code logic components of the full stack associated with the unseen source code scripts, and the target code requirements; and transmit control signals configured to cause the user input device to display the predicted target code scripts.

3. The system of claim 2, wherein the at least one processor is further configured to:

initiate a code validation engine on the predicted target code scripts;

validate, using the code validation engine, the predicted target code scripts; and transmit control signals configured to cause the user input device to display a notification indicating that the predicted target code scripts are valid.

4. The system of claim 1, wherein the one or more tiers in the full stack comprises at least a front-end tier, a business logic tier, and a back-end tier.

5. The system of claim 1, wherein the source code scripts are associated with a first programming language and the target code scripts are associated with a second programming language.

6. The system of claim 5, wherein the source code scripts are associated with a first version of the first programming language and the target code scripts are associated with a second version of the first programming language.

7. The system of claim 6, wherein the source code scripts are associated with the first version of the first programming language to be implemented in a first tier in the full stack and the target code scripts are associated with the first version of the first programming language to be implemented in a second tier in the full stack.

8. The system of claim 1, wherein the at least one processor is further configured to:

store the source code scripts and the target code scripts in a code repository.

9. The system of claim 8, wherein the at least one processor is further configured to:

electronically receive, from the user input device, a source code script location path and a target code script location path associated with the code repository; and retrieve, from the code repository, a source code script based on at least the source code script location path and a target code script based on at least the target code script location path.

10. The system of claim 1, wherein the at least one processor is further configured to:

transmit control signals configured to cause the user input device to display an artifact loader interface; and electronically receive, via the artifact loader interface, the source code scripts and the target code scripts.

11. A computer program product for continuous cognitive code logic detection and prediction using machine learning techniques, the computer program product comprising a non-transitory computer-readable medium storing code causing a first apparatus to:

electronically receive, from a user input device, source code scripts for functional code logic components of a full stack, wherein the source code scripts are associated with one or more tiers in the full stack;

electronically receive, from the user input device, target code scripts for the functional code logic components of the full stack, wherein the target code scripts are associated with the one or more tiers in the full stack;

generate a training dataset based on at least the source code scripts, the target code scripts, and the functional code logic components of the full stack;

train, using a machine learning algorithm, a machine learning model using the training dataset;

determine a prediction accuracy associated with the trained machine learning model;

determine that the prediction accuracy associated with the trained machine learning model is greater than a predetermined threshold; and in response to determining that the prediction accuracy associated with the trained machine learning model is greater than the predetermined threshold, deploy the trained machine learning model on unseen source code scripts.

12. The computer program product of claim 11, wherein the first apparatus is further configured to:

electronically receive, from the user input device, the unseen source code scripts;

determine functional code logic components of the full stack associated with the unseen source code scripts;

electronically receive, from the user input device, target code requirements;

predict, using the trained machine learning model, target code scripts corresponding to the unseen source code scripts for the one or more tiers in the full stack based on at least the unseen source code scripts, the functional code logic components of the full stack associated with the unseen source code scripts, and the target code requirements; and transmit control signals configured to cause the user input device to display the predicted target code scripts.

13. The computer program product of claim 12, wherein the first apparatus is further configured to:

initiate a code validation engine on the predicted target code scripts;

validate, using the code validation engine, the predicted target code scripts; and transmit control signals configured to cause the user input device to display a notification indicating that the predicted target code scripts are valid.

14. The computer program product of claim 11, wherein the one or more tiers in the full stack comprises at least a front-end tier, a business logic tier, and a back-end tier.

15. The computer program product of claim 11, wherein the source code scripts are associated with a first programming language and the target code scripts are associated with a second programming language.

16. The computer program product of claim 15, wherein the source code scripts are associated with a first version of the first programming language and the target code scripts are associated with a second version of the first programming language.

17. The computer program product of claim 16, wherein the source code scripts are associated with the first version of the first programming language to be implemented in a first tier in the full stack and the target code scripts are associated with the first version of the first programming language to be implemented in a second tier in the full stack.

18. The computer program product of claim 11, wherein the first apparatus is further configured to:

store the source code scripts and the target code scripts in a code repository.

19. The computer program product of claim 18, wherein the first apparatus is further configured to:

electronically receive, from the user input device, a source code script location path and a target code script location path associated with the code repository; and retrieve, from the code repository, a source code script based on at least the source code script location path and a target code script based on at least the target code script location path.

20. A method for continuous cognitive code logic detection and prediction using machine learning techniques, the method comprising:

electronically receiving, from a user input device, source code scripts for functional code logic components of a full stack, wherein the source code scripts are associated with one or more tiers in the full stack;

electronically receiving, from the user input device, target code scripts for the functional code logic components of the full stack, wherein the target code scripts are associated with the one or more tiers in the full stack;

generating a training dataset based on at least the source code scripts, the target code scripts, and the functional code logic components of the full stack;

training, using a machine learning algorithm, a machine learning model using the training dataset;

determining a prediction accuracy associated with the trained machine learning model;

determining that the prediction accuracy associated with the trained machine learning model is greater than a predetermined threshold; and in response to determining that the prediction accuracy associated with the trained machine learning model is greater than the predetermined threshold, deploying the trained machine learning model on unseen source code scripts.

\* \* \* \* \*